United States Patent
Cho et al.

(10) Patent No.: US 9,699,602 B2
(45) Date of Patent: Jul. 4, 2017

(54) PERIPHERAL APPARATUS, SERVER APPARATUS AND METHOD FOR DETERMINING LOCATION OF PORTABLE APPARATUS

(71) Applicant: Samsung Electronics Co., Ltd., Suwon-si, Gyeonggi-do (KR)

(72) Inventors: Sung Jae Cho, Seoul (KR); Yu Sung Chang, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 28 days.

(21) Appl. No.: 14/751,955

(22) Filed: Jun. 26, 2015

(65) Prior Publication Data

US 2015/0382140 A1    Dec. 31, 2015

(30) Foreign Application Priority Data

Jun. 27, 2014  (KR) ........................ 10-2014-0079930

(51) Int. Cl.
  *H04W 4/02* (2009.01)
  *G01S 5/00* (2006.01)
  *G01S 5/02* (2010.01)

(52) U.S. Cl.
  CPC ............. *H04W 4/02* (2013.01); *G01S 5/0036* (2013.01); *G01S 5/0231* (2013.01)

(58) Field of Classification Search
  CPC ......... H04W 4/02; H04W 4/008; H04W 4/22; G01S 5/0231; H04L 69/22

USPC ...................................................... 455/457
  See application file for complete search history.

(56) References Cited

U.S. PATENT DOCUMENTS

| | | | |
|---|---|---|---|
| 7,548,158 B2 | 6/2009 | Titus et al. | |
| 8,102,252 B2 | 1/2012 | Titus et al. | |
| 8,436,728 B2 | 5/2013 | Titus et al. | |
| 8,755,767 B2 | 6/2014 | Maier et al. | |
| 2007/0030144 A1 | 2/2007 | Titus et al. | |
| 2009/0221263 A1 | 9/2009 | Titus et al. | |
| 2012/0119903 A1 | 5/2012 | Titus et al. | |
| 2013/0115872 A1* | 5/2013 | Huang | H04W 4/02 455/3.01 |
| 2013/0203376 A1 | 8/2013 | Maier et al. | |
| 2013/0252572 A1 | 9/2013 | Titus et al. | |
| 2015/0382140 A1* | 12/2015 | Cho | H04W 4/02 455/457 |

FOREIGN PATENT DOCUMENTS

KR    10-2012-0050265 A    5/2012

* cited by examiner

*Primary Examiner* — Kimberly A Williams
(74) *Attorney, Agent, or Firm* — Jefferson IP Law, LLP

(57) ABSTRACT

A peripheral device for determining a location of at least one portable device is provided. The peripheral device includes a communication module configured to communicate with at least one portable device and a server device, and a control module configured to obtain a broadcast signal broadcast from the at least one portable device and provide location-related information to the server device configured to determine a location of the portable device, the location-related information including a time at which the broadcast signal is obtained and location information of the peripheral device.

20 Claims, 11 Drawing Sheets

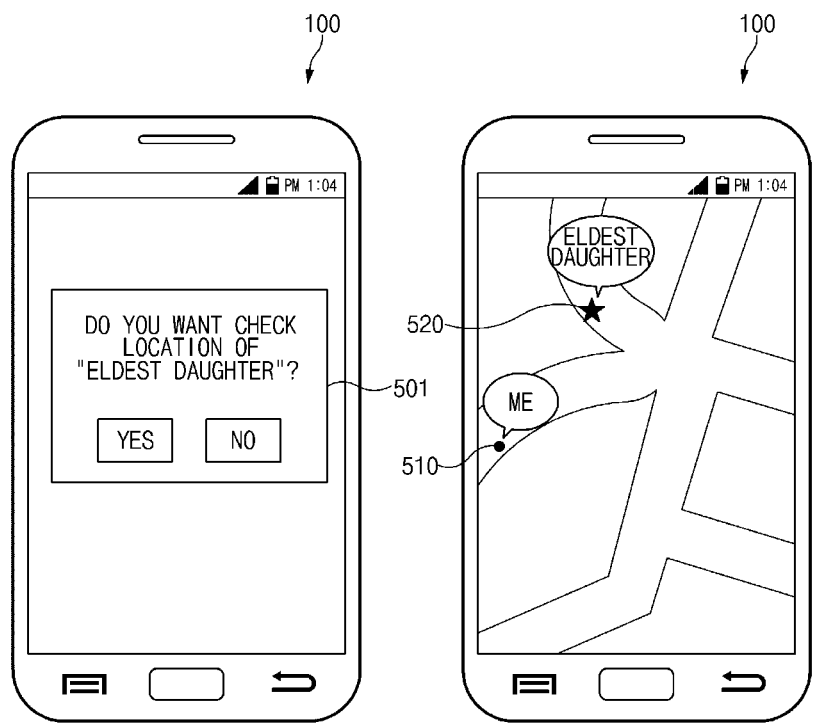

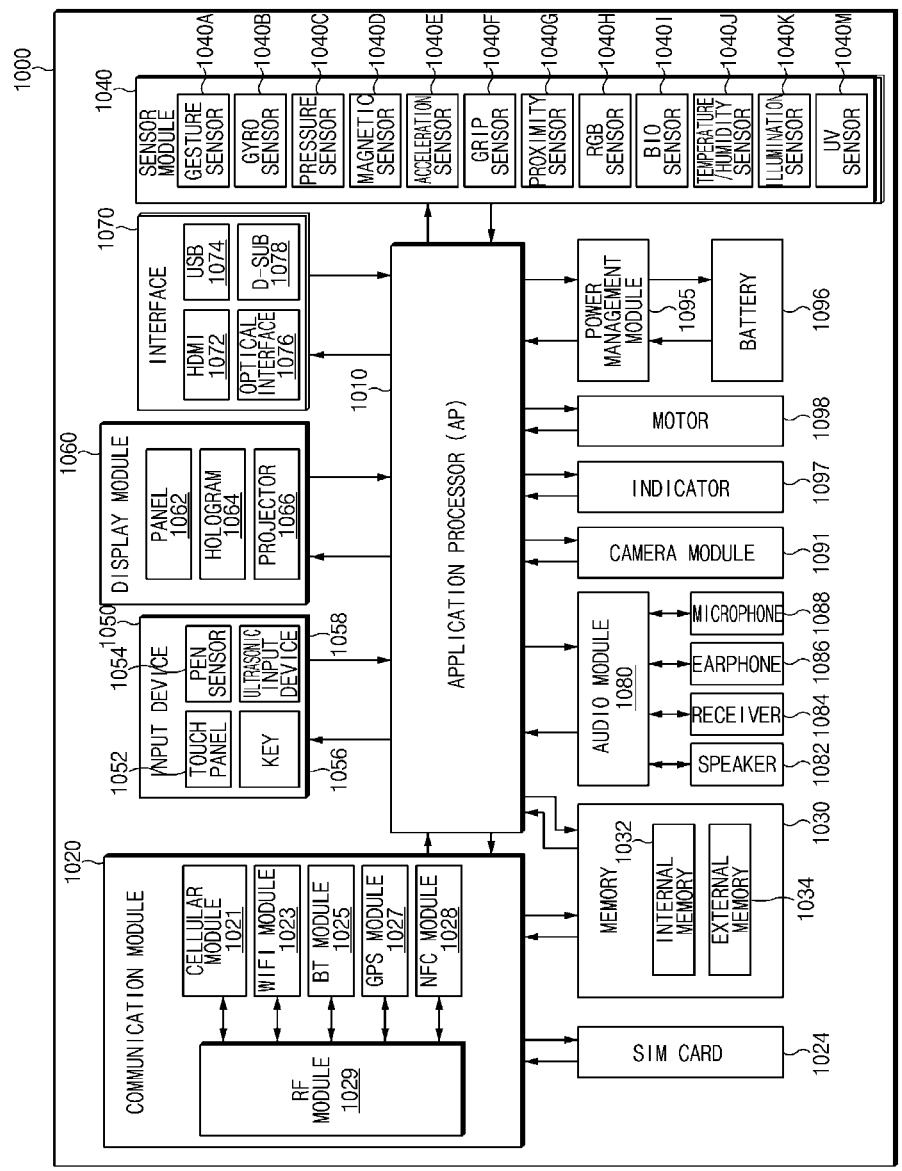

ically connected to each other through a pairing operation so that the electronic device continuously monitors a location of the portable device. Therefore, if the wireless connection is terminated, the location of the portable device cannot be determined.

PERIPHERAL APPARATUS, SERVER APPARATUS AND METHOD FOR DETERMINING LOCATION OF PORTABLE APPARATUS

CROSS-REFERENCE TO RELATED APPLICATION(S)

This application claims the benefit under 35 U.S.C. §119 (a) of a Korean patent application filed on Jun. 27, 2014 in the Korean Intellectual Property Office and assigned Serial number 10-2014-0079930, the entire disclosure of which is hereby incorporated by reference.

TECHNICAL FIELD

The present disclosure relates to a peripheral device, a server device and a method for determining a location of a portable device using location-related information received from at least one peripheral device that performs wireless communication.

BACKGROUND

With the growing development of digital technology, continuing improvements are made to various portable devices such as mobile communication devices, personal digital assistants (PDAs), electronic organizers, smartphones, tablets, and personal computers (PCs) for supporting mobile communication and processing personal information.

In particular, such portable devices have been improved to pair with other electronic devices so that parents may determine locations of their children, who carry the portable devices, by using the other electronic devices in order to protect their children.

The above information is presented as background information only to assist with an understanding of the present disclosure. No determination has been made, and no assertion is made, as to whether any of the above might be applicable as prior art with regard to the present disclosure.

SUMMARY

As described above, according to the related art, an electronic device and a portable device should be wirelessly connected to each other through a pairing operation so that the electronic device continuously monitors a location of the portable device. Therefore, if the wireless connection is terminated, the location of the portable device cannot be determined.

Aspects of the present disclosure are to address at least the above-mentioned problems and/or disadvantages and to provide at least the advantages described below. Accordingly, an aspect of the present disclosure is to provide a peripheral device, a server device and a method for determining a location of a portable device, wherein location-related information is received from at least one peripheral device that has obtained a Bluetooth low energy (BLE) signal broadcast from the portable device according to specific conditions.

In accordance with an aspect of the present disclosure, a peripheral device is provided. The peripheral device includes a communication module configured to communicate with at least one portable device and at least one server device, and a control module configured to obtain a broadcast signal broadcast from the at least one portable device and provide location-related information to the at least one server device so that the server device determines a location of the portable device, the location-related information including a time at which the broadcast signal is obtained and location information of the peripheral device.

In accordance with another aspect of the present disclosure, a method for determining a location of a portable device is provided. The method includes obtaining a broadcast signal broadcast from at least one portable device, determining time information and location information at a time of obtaining the broadcast signal, generating location-related information including the time information and the location information, and providing the location-related information to at least one server device so that the server device determines the location of the portable device.

In accordance with another aspect of the present disclosure, a server device is provided. The server device includes a communication module configured to communicate with at least one peripheral device, and a control module configured to determine a first location of at least one portable device according to location-related information generated by the at least one peripheral device on the basis of a broadcast signal broadcast from the portable device.

In accordance with another aspect of the present disclosure, a method for determining a location of a portable device is provided. The method includes receiving location-related information generated from at least one peripheral device on the basis of a broadcast signal broadcast from at least one portable device, and determining a first location of the portable device using the location-related information.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 8A and 8B are diagrams illustrating screens of a user interface of an electronic device for determining a location of a portable device according to an embodiment of the present disclosure.

FIG. 10 is a block diagram illustrating an electronic device according to various embodiments of the present disclosure.

Throughout the drawings, it should be noted that like reference numbers are used to depict the same or similar elements, features, and structures.

DETAILED DESCRIPTION

Figure 1:
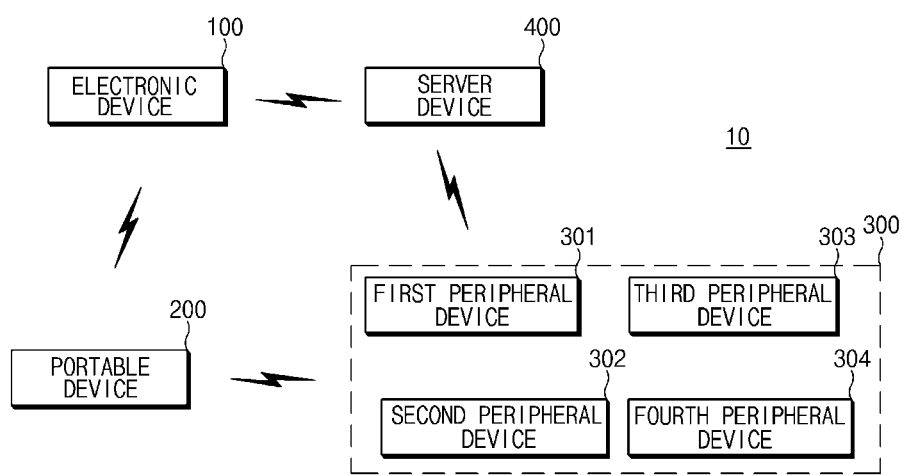
FIG. 1 is a block diagram illustrating a system for determining a location of a portable device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The term "include," "comprise," "including," or "comprising" used herein indicates disclosed functions, operations, or existence of elements but does not exclude other functions, operations or elements. It should be further understood that the term "include", "comprise", "have", "including", "comprising", or "having" used herein specifies the presence of stated features, integers, steps, operations, elements, components, or combinations thereof but does not preclude the presence or addition of one or more other features, integers, steps, operations, elements, components, or combinations thereof.

The meaning of the term "or" used herein includes any combination of the words connected by the term "or". For example, the expression "A or B" may indicate A, B, or both A and B.

The terms such as "first", "second", and the like used herein may refer to various elements of various embodiments of the present disclosure, but do not limit the elements. For example, such terms do not limit the order and/or priority of the elements. Furthermore, such terms may be used to distinguish one element from another element. For example, "a first user device" and "a second user device" indicate different user devices. For example, without departing the scope of the present disclosure, a first element may be named as a second element, and similarly, a second element may be named as a first element.

It should be understood that when an element is referred to as being "connected" or "coupled" to another element, it can be directly connected or coupled to the other element or intervening elements may be present between the element and the other element. On the contrary, it should be understood when an element is referred to as being "directly connected" or "directly coupled" to another element, there are no intervening elements between the element and the other element.

The terminology used herein is not for delimiting the various embodiments of the present disclosure but for describing specific examples of the present disclosure. The terms of a singular form may include plural forms unless otherwise specified.

The terms used herein, including technical or scientific terms, have the same meanings as understood by those skilled in the art unless otherwise defined herein. The commonly used terms such as those defined in a dictionary should be interpreted in the same context as in the related art and should not be interpreted in an idealized or overly formal sense unless otherwise defined explicitly.

Portable devices, electronic devices and peripheral devices according to the various embodiments of the present disclosure may include communication functions. For example, the portable devices and the electronic devices may include at least one of smartphones, tablet personal computers (PCs), mobile phones, video telephones, electronic book readers, desktop PCs, laptop PCs, netbook computers, personal digital assistants (PDAs), portable multimedia players (PMPs), MP3 players, mobile medical devices, cameras, wearable devices (e.g., head-mounted-devices (HMDs) such as electronic glasses), electronic apparel, electronic bracelets, electronic necklaces, electronic accessories, electronic tattoos, and smart watches.

According to various embodiments of the present disclosure, the peripheral devices may be smart home appliances having communication functions. The smart home appliances may include at least one of, for example, televisions (TVs), digital video disc (DVD) players, audios, refrigerators, air conditioners, cleaners, ovens, microwave ovens, washing machines, air cleaners, set-top boxes, TV boxes (e.g., Samsung HomeSync™, Apple TV™, or Google TV™), game consoles, electronic dictionaries, electronic keys, camcorders, and electronic picture frames.

According to various embodiments of the present disclosure, the peripheral devices may include at least one of medical devices (e.g., magnetic resonance angiography (MRA), magnetic resonance imaging (MRI), computed tomography (CT), scanners, and ultrasonic devices), navigation devices, global positioning system (GPS) receivers, event data recorders (EDRs), flight data recorders (FDRs), vehicle infotainment devices, electronic equipment for vessels (e.g., navigation systems and gyrocompasses), avionics, security devices, head units for vehicles, industrial or home robots, automatic teller machines (ATMs), and points of sales (POSs).

According to various embodiments of the present disclosure, the peripheral devices may include at least one of parts of furniture or buildings/structures having communication functions, electronic boards, electronic signature receiving devices, projectors, and measuring instruments (e.g., water meters, electricity meters, gas meters, and wave meters). The peripheral devices according to various embodiments of the present disclosure may be one or more combinations of the above-mentioned devices. Furthermore, the peripheral devices according to various embodiments of the present disclosure may be flexible devices. The peripheral devices according to various embodiments of the present disclosure are not limited to the above-mentioned devices, and may include other devices known to one of ordinary skill in the art as well as those devices later developed.

Hereinafter, the electronic devices according to various embodiments of the present disclosure will be described with reference to the accompanying drawings. The term "user" used herein may refer to a person who uses an electronic device or a device (e.g., an artificial electronic device) that uses an electronic device.

FIG. 1 is a block diagram illustrating a system for determining a location of a portable device according to an embodiment of the present disclosure.

Referring to FIG. 1, a location determining system 10 according to embodiments of the present disclosure may include an electronic device 100, a portable device 200, at least one peripheral device 300 and a server device 400. Accordingly, the electronic device 100, which is a master device, may be paired with the portable device 200. The portable device 200 may be a slave device of the electronic device 100 paired therewith.

In an embodiment of the present disclosure, the electronic device 100 may be connected to the portable device 200 using a short-range wireless communication technology such as Bluetooth so as to determine a location of the portable device 200 in real time or periodically. The electronic device 100 may transmit, to the portable device 200, unique information such as a phone number and an identification number of the electronic device 100 when an operation of pairing with the portable device 200 is performed.

When the electronic device 100 is outside the coverage of the Bluetooth communication with the portable device 200, the Bluetooth connection to the portable device 200 may be terminated. The electronic device 100 may confirm an emergency situation in which the location of the portable device 200 is unable to be determined due to the termination of the Bluetooth connection. When the emergency situation is confirmed, the electronic device 100 may transmit, to the server device 400, a location determination message for determining the location of the portable device 200. Regardless of whether the Bluetooth connection to the portable device 200 is terminated, the electronic device 100 may transmit the location determination message to the server device 400 to determine the location of the portable device 200. Accordingly, the location determination message may include the unique information including the phone number and the identification number of the electronic device 100 and location information of the electronic device 100, and may include unique information including an identification number of the portable device 200.

The portable device 200 may be connected to the electronic device 100 using a short-range wireless communication technology such as Bluetooth so as to provide location-related information to the electronic device 100. When the portable device 200 is paired with the electronic device 100, the portable device 200 may store the unique information of the electronic device 100 received from the electronic device 100.

The portable device 200 may broadcast a Bluetooth low energy (BLE) signal in real time or periodically using a BLE communication technology. According to various embodiments of the present disclosure, when a specific event occurs, the portable device 200 may change a header value of a protocol for the BLE signal to broadcast the BLE signal. Accordingly, the specific event may occur by a button provided to the portable device 200. The button may be operated by a user of the portable device 200 so as to provide location information of the user to the electronic device 100 connected to the portable device 200 by Bluetooth communication.

At least one peripheral device 300 may perform BLE communication to obtain the BLE signal broadcast from the portable device 200. According to an embodiment of the present disclosure, the peripheral device 300 may receive the location determination message from the server device 400. The peripheral device 300 may discard the BLE signal broadcast from the portable device 200 before the location determination message is received. The peripheral device 300 may determine the identification number of the portable device 200 included in the received location determination message, and may obtain the BLE signal broadcast from the portable device 200 corresponding to the identification number as an emergency signal.

According to an embodiment of the present disclosure, regardless of whether the location determination message is received, the peripheral device 300 may determine a header value of the BLE signal broadcast in real time from the portable device 200. The peripheral device 300 may obtain the BLE signal of which the header value has been changed as the emergency signal, and may discard the BLE signal of which the header value has not been changed.

The peripheral device 300 may generate location-related information on the basis of the emergency signal, and may transmit the location-related information to the server device 400. According to an embodiment of the present disclosure, in the case where a first peripheral device 301 receives the emergency signal, the first peripheral device 301 may generate the location-related information including an identification number of the first peripheral device 301, location information of the first peripheral device 301, an intensity of the emergency signal at the time of receiving the emergency signal, and information on the time of obtaining the emergency signal. The first peripheral device 301 may transmit the generated location-related information to the server device 400.

The first peripheral device 301 may generate the location-related information and may transmit the location-related information to the server device 400 whenever the emergency signal is obtained from the portable device 200 located within a communication range of the first peripheral device 301. When the portable device 200 is within the communication range of the first peripheral device 301, it is not necessary for the first peripheral device 301 to continuously generate the location-related information for the portable device 200. In this case, the first peripheral device 301 may generate the location-related information at intervals of a specific time. For example, even though the emergency signal is obtained from the portable device 200, the first peripheral device 301 may not generate the location-related information for the obtained emergency signal if the interval of the specific time does not expire.

When the first peripheral device 301 does not generate the location-related information for the emergency signal broadcast from the portable device 200, the first peripheral device 301 may obtain the emergency signal broadcast from another portable device (not illustrated). In this case, the first peripheral device 301 may generate the location-related information for the emergency signal broadcast from the other portable device. The first peripheral device 301 may transmit, to the server device 400, the location-related information for the emergency signal broadcast from the other portable device. The first peripheral device 301 may additionally set and manage a specific time interval for another electronic device. Accordingly, the specific time interval may be preset or may be set by a manger of the peripheral device 300.

The server device 400 may determine the location of the portable device 200 on the basis of the location-related information received from the at least one peripheral device 300, and may track a current location or a moving route of the portable device 200 using the determined location.

According to an embodiment of the present disclosure, upon receiving the location determination message from the electronic device 100, the server device 400 may transmit the location determination message to at least one base station (not illustrated) located within a certain range from the electronic device 100. The at least one base station that has received the location determination message may transmit the location determination message to the at least one peripheral device 300 located within a communication range of the at least one base station. The server device 400 may receive the location-related information from the at least one peripheral device 300 that has received the location determination message via the base station.

According to an embodiment of the present disclosure, regardless of whether the location determination message is transmitted to the at least one peripheral device 300, the server device 400 may receive the location-related information. Accordingly, the peripheral device 300 may determine the header value of the BLE signal broadcast from the portable device 200 so as to generate the location-related information.

The server device 400 may determine a first location of the portable device 200 using the location-related information received from the at least one peripheral device 300. According to an embodiment of the present disclosure, in the case where the portable device 200 is located in the vicinity of the first peripheral device 301, a second peripheral device 302 and a third peripheral device 303, the server device 400 may receive the location-related information from each of the peripheral devices 301 to 303. The server device 400 may determine a time at which the first peripheral device 301 obtains the emergency signal, the intensity of the emergency signal and the location of the first peripheral device 301, from the location-related information received from the first peripheral device 301. Likewise, the server device 100 may determine times at which the second and third peripheral devices 302 and 303 obtain the emergency signals, the intensities of the emergency signals and the locations of the second and third peripheral devices 302 and 303, from each location-related information received from the second and third peripheral devices 302 and 303. If the times at which the first to third peripheral devices 301 to 303 obtain the emergency signals are the same or similar to each other, the server device 400 may confirm that the portable device 200 exists at a location where communication ranges of the first to third peripheral devices 301 to 303 overlap each other. The server device 400 may estimate the distances between the portable device 200 and the peripheral devices 301 to 303 on the basis of the intensities of the emergency signals determined in the first to third peripheral devices 301 to 303. The server device 400 may determine the first location of the portable device 200 using the estimated distances and the locations of the peripheral devices 301 to 303.

The server device 400 may confirm that the location-related information is received from the at least one peripheral device 300 before a predetermined time elapses after determining the first location of the portable device 200. The server device 400 may determine a second location of the portable device 200 using the received location-related information. According to an embodiment of the present disclosure, in the case where the portable device 200 is located in the vicinity of a fourth peripheral device 304, the server device 400 may receive the location-related information from the fourth peripheral device 304. The server device 400 may determine a time at which the fourth peripheral device 304 obtains the emergency signal, the intensity of the emergency signal and the location of the fourth peripheral device 304, from the location-related information received from the fourth peripheral device 304. Since the BLE signal broadcast from the portable device 200 is obtained by the fourth peripheral device 304 as the emergency signal, the server device 400 may confirm that the portable device 200 exists within a communication range of the fourth peripheral device 304. The server device 400 may estimate the distance between the portable device 200 and the fourth peripheral device 304 on the basis of the intensity of the emergency signal determined in the fourth peripheral device 304 and the location of the fourth peripheral device 304. The server device 400 may determine the second location of the portable device 200 using the estimated distance and the location of the fourth peripheral device 304. Accordingly, the server device 400 may refine the second location on the basis of the first location determined by at least three peripheral devices 301 to 303, in order to improve the accuracy of the second location. For example, the server device 400 may confirm all locations having the estimated distance to the fourth peripheral device 304 as candidate locations for the second location. The server device 400 may extract, from the plurality of confirmed candidate locations, candidate locations to which the portable device 200 is able to be moved, on the assumption that the first to fourth peripheral devices 301 to 304 are located on a road on which the first to fourth peripheral devices 301 to 304 are able to be moved. The server device 400 may refine the second location with a candidate location having a shortest distance to the first location among the extracted candidate locations.

According to an embodiment of the present disclosure, server device 400 may extract map data within a certain radius, e.g., about 1 km, from the first location of the portable device 200, from pre-stored map data. The server device 400 may display the first and second locations of the portable device 200 on the extracted map data to provide the map data to the electronic device 100. The server device 400 may display a moving route of the portable device 200 to provide the map data to the electronic device 100. The server device 400 may change the extracted map data on the basis of the movement of the portable device 200. Accordingly, the certain radius may be changed by a manager of the server device 400.

According to an embodiment of the present disclosure, the server device 400 may determine any one of the first and second locations of the portable device 200. The server device 400 may determine new first and second locations using the location-related information received from the peripheral device 300 after a certain time elapses.

According to an embodiment of the present disclosure, the server device 400 may receive the location-related information from the plurality of peripheral devices 300 in real time or periodically. The server device 400 may be reconnected to the portable device 200 by Bluetooth communication, or may receive the location-related information until a selection for finishing the tracking of the location of the portable device 200 is input from a user. The server device 400 may determine the location and moving route of the portable device 200 on the basis of the received location-related information.

According to an embodiment of the present disclosure, the server device 400 may provide the location and moving route of the portable device 200 to an emergency center such as a police station, or the server device 400 may be an emergency center of a police station or the like.

In an embodiment of the present disclosure, the electronic device 100 may be connected to the portable device 200 using a short-range wireless communication technology such as Bluetooth so as to determine the location of the portable device 200 in real time or periodically. The electronic device 100 may transmit, to the portable device 200, unique information such as a phone number and an identification number of the electronic device 100 when an operation of pairing with the portable device 200 is performed.

When the electronic device 100 is outside the coverage of the Bluetooth communication with the portable device 200, the Bluetooth connection to the portable device 200 may be terminated. When the electronic device 100 confirms an emergency situation in which the location of the portable device 200 is unable to be determined due to the termination of the Bluetooth connection, the electronic device 100 may transmit a location determination message to the server device 400. The location determination message may be for determining the location of the portable device 200. Regardless of whether the Bluetooth connection to the portable device 200 is terminated, the electronic device 100 may transmit the location determination message to the server device 400 to determine the location of the portable device 200. Accordingly, the location determination message may include location information of the electronic device 100 and may include unique information including an identification number of the paired portable device 200.

The portable device 200 may be connected to the electronic device 100 using a short-range wireless communication technology such as Bluetooth so as to provide location-related information to the electronic device 100. When the portable device 200 is paired with the electronic device 100, the portable device 200 may store the unique information of the electronic device 100 received from the electronic device 100.

The portable device 200 may broadcast a BLE signal in real time or periodically using a BLE communication technology. The portable device 200 may detect the termination of the communication with the electronic device 100 or occurrence of a specific event. According to a result of the detection, the portable device 200 may change a header value of a protocol for the BLE signal, and may add the unique information of the electronic device 100 to the BLE signal to broadcast the BLE signal.

The at least one peripheral device 300 may receive the location determination message from the server device 400. The peripheral device 300 may discard the BLE signal broadcast from the portable device 200 before the location determination message is received. The peripheral device 300 may determine the unique information of the portable device 200 included in the location determination message. If the portable device 200 that broadcasts the BLE signal corresponds to the unique information included in the location determination message, the peripheral device 300 may obtain the BLE signal as an emergency signal.

The peripheral device 300 may generate location-related information on the basis of the emergency signal. The peripheral device 300 may transmit the generated location-related information to the electronic device 100 corresponding to the unique information of the electronic device 100 included in the emergency signal. The electronic device 100 may determine the location and moving route of the portable device 200 according to the received location-related information. Accordingly, the determining of the location and moving route of the portable device may be performed in the same manner as the server device 400 determines the location and moving route of the portable device in the above-mentioned embodiment of the present disclosure. Therefore, detailed descriptions of the determining of the location and moving route of the portable device are omitted.

Figure 2:
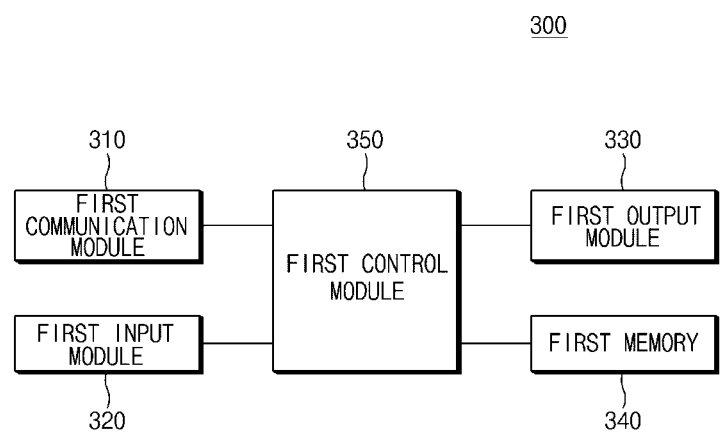
FIG. 2 is a block diagram illustrating a peripheral device according to an embodiment of the present disclosure.

FIG. 2 is a block diagram illustrating a peripheral device according to an embodiment of the present disclosure.

Referring to FIGS. 1 and 2, the peripheral device 300 according to an embodiment of the present disclosure may include a first communication module 310, a first input module 320, a first output module 330, a first memory 340 and a first control module 350.

The first communication module 310 may communicate with at least one portable device 200 and the server device 400. For example, the first communication module 310 may communicate with the portable device 200 and the server device 400 by wireless communication or wired communication. The wired communication may be performed through a universal serial bus (USB), high definition multimedia interface (HDMI), recommended standard 232 (RS-232), or plain old telephone service (POTS). The wireless communication may be performed through wireless fidelity (Wi-Fi), Bluetooth (BT), near field communication (NFC), Bluetooth low energy (BLE) or cellular communication technology (e.g., long term evolution (LTE), long term evolution-advanced (LTE-A), code division multiple access (CDMA), wideband code division multiple access (WCDMA), the universal mobile telecommunications system (UMTS), wireless broadband (WiBro), or global system for mobile communications (GSM)).

The first communication module 310 may include a BLE communication module (not illustrated) for performing BLE communication with the at least one portable device 200. The BLE communication module may obtain the BLE signals broadcast from the at least one portable device 200 as the emergency signal.

The first communication module 310 may include a server communication module (not illustrated) for performing wireless or wired communication with the server device 400. The server communication module may provide the location determination message received from the server device 400 to the first control module 350. The server communication module may be controlled by the first control module 350 so as to transmit the location-related information to the server device 400.

The first input module 320 may generate an operation signal for operating the peripheral device 300 according to an input from the outside, and may transmit the operation signal to the first control module 350. The first input module 320 may include an input device such as a key button, a keyboard, a keypad, a touchpad, or a touch screen.

The first output module 330 may display an execution screen operated according to control by the first control module 350. The first output module 330 may include a liquid crystal display (LCD) or a touchscreen. In the case where the first output module 330 includes the touchscreen, the first output module 330 may also perform an operation of the first input module 320.

The first memory 340 may store a program or application for operating the peripheral device 300. The first memory 340 may include location information. The first memory 340 may include a program for generating the location-related information from the emergency signal.

The first control module 350 may obtain the BLE signals broadcast from the at least one portable device 200 as the emergency signal. The first control module 350 may generate the location-related information on the basis of the emergency signal. The first control module 350 may control the first communication module 310 so as to transmit the generated location-related information to the server device 400. According to an embodiment of the present disclosure, the first control module 350 may receive the BLE signals broadcast from the at least one portable device 200. The first control module 350 may obtain the BLE signal broadcast from the portable device 200 corresponding to the unique information of the portable device 200 included in the location determination message, among the received BLE signals, as the emergency signal.

According to an embodiment of the present disclosure, the first control module 350 may determine the header value of the protocol for the BLE signal broadcast from the portable device 200 using the first communication module 310. The first control module 350 may determine the header value so as to selectively obtain the BLE signal as the emergency signal. Accordingly, if a specific event occurs in the portable device 200, the protocol header value for the BLE signal may be changed from the time when the specific event occurs. The first control module 350 may not obtain the BLE signal of which the header value has not been changed, but may obtain, as the emergency signal, the BLE signal of which the header value has been changed.

The first control module 350 may generate the location-related information on the basis of the obtained emergency signal, and may transmit the location-related information to the server device 400. The location-related information may include the identification number of the peripheral device 300, the location information of the peripheral device 300, the time at which the emergency signal is obtained and the intensity of the emergency signal stored in the first memory 340.

The first control module 350 may generate the location-related information and may transmit the location-related information to the server device 400 as the emergency signal whenever the BLE signal broadcast from the portable device 200 located within the communication range of the first control module 350 is obtained. When the portable device 200 is within the communication range of the first control module 350, the first control module 350 may generate the location-related information at intervals of a specific time. Since the portable device 200 is located within the communication range, it is not necessary for the first control module 350 to continuously generate the location-related information for the portable device 200. For example, even though the emergency signal is received from the portable device 200, the first control module 350 may not generate the location-related information for the obtained emergency signal if the interval of the specific time does not expire.

When the first control module 350 does not generate the location-related information for the obtained emergency signal, the first control module 350 may obtain the BLE signal broadcast from another portable device (not illustrated) as the emergency signal. In this case, the first control module 350 may generate the location-related information for the emergency signal obtained from the other portable device. The first control module 350 may transmit, to the server device 400, the location-related information for the emergency signal obtained from the other portable device. The first control module 350 may additionally set and manage a specific time interval for another electronic device. Accordingly, the specific time interval may be preset or may be set by the manager of the peripheral device 300.

According to an embodiment of the present disclosure, the peripheral device 300 for determining the location of the portable device 200 may include the first communication module 310 for communicating with the at least one portable device 200 and at least one server device 400 and the first control module 350 for obtaining broadcast signals broadcast from the at least one portable device 200 and providing the location-related information to the at least one server device 400 so that the server device 400 determines the location of the portable device 200, the location-related information including information on a time at which the broadcast signal is obtained and location information of the peripheral device 300. According to an embodiment of the present disclosure, upon receiving the location determination message for determining the location of the portable device 200 from the server device 400, the first control module 350 may obtain the broadcast signal. According to an embodiment of the present disclosure, the first control module 350 may obtain the broadcast signal in the case where a header value of the broadcast signal is based on a specific event.

The location-related information may include the unique information of the portable device 200, the identification number and location information of the peripheral device 300, information on the time at which the broadcast signal is obtained, and the intensity of the broadcast signal.

Figure 3:
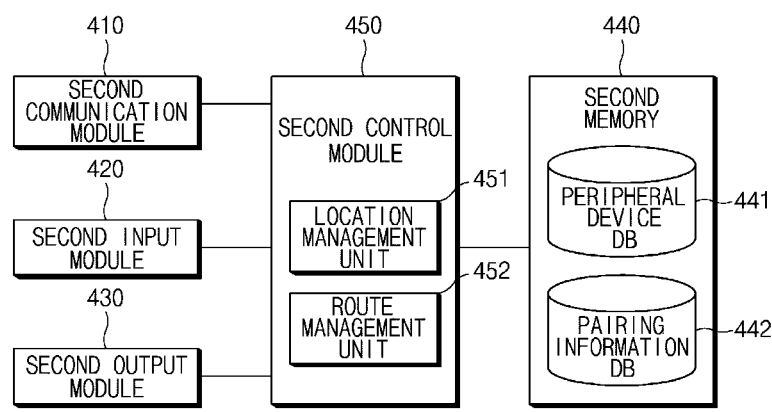
FIG. 3 is a block diagram illustrating a server device according to an embodiment of the present disclosure.

FIG. 3 is a block diagram illustrating a server device according to an embodiment of the present disclosure.

Referring to FIGS. 1 to 3, the server device 400 according to the present disclosure may include a second communication module 410, a second input module 420, a second output module 430, a second memory 440 and a second control module 450. The second memory 440 may include a peripheral device database (DB) 441 and a pairing information DB 442, and the second control module 450 may include a location management unit 451 and a route management unit 452.

The second communication module 410 may communicate with at least one electronic device 100 and at least one peripheral device 300. For example, the second communication module 410 may communicate with the electronic device 100 and the peripheral device 300 by wireless communication or wired communication. The wired communication may be performed through a USB, HDMI, RS-232, or POTS. The wireless communication may be performed through Wi-Fi, BT, NFC, or cellular communication technology (e.g., LTE, LTE-A, CDMA, WCDMA, UMTS, WiBro, or GSM).

The second communication module 410 may receive the location determination message from the at least one electronic device 100. The second communication module 410 may transmit the received location determination message to the at least one peripheral device 300. The second communication module 410 may provide, to the second control module 450, the location-related information received from the at least one peripheral device 300.

The second input module 420 may generate an operation signal for operating the sever device 400 according to an input from the outside, and may transmit the operation signal to the second control module 450. The second input module 420 may include an input device such as a key button, a keyboard, a keypad, a touchpad, or a touch screen.

The second output module 430 may display an execution screen operated according to control by the second control module 450. The second output module 430 may include an LCD or a touchscreen. In the case where the second output module 430 includes the touchscreen, the second output module 430 may also perform an operation of the second input module 420.

The second memory 440 may store a program or application for operating the server device 400. The peripheral device DB 441 of the second memory 440 may store the unique information including the identification number of the at least one peripheral device 300 and the location information of the peripheral device 300. The pairing information DB 442 of the second memory 440 may map the unique information of the electronic device 100 to the unique information of the portable device 200 paired with the electronic device 100, so as to store the unique information of the electronic device 100 and the unique information of the portable device 200.

The second control module 450 may determine the location of the portable device 200 from the location-related information generated by the at least one peripheral device 300. The second control module 450 may map the unique information of the electronic device 100 to the unique information of the portable device 200 so as to store the unique information of the electronic device 100 and the unique information of the portable device 200 in the pairing information DB 442.

According to an embodiment of the present disclosure, the second control module 450 may receive, from the at least one electronic device 100, the location determination message for determining the location of the portable device 200 paired with the electronic device 100. The second control module 450 may transmit the location determination message to the at least one peripheral device 300. The second communication module 450 may transmit the location determination message to at least one base station (not illustrated) located within a certain range from the electronic device 100. The at least one base station that has received the location determination message may transmit the location determination message to the at least one peripheral device 300 located within a communication range of the at least one base station. The second control module 450 may receive the location-related information from the at least one peripheral device 300 via the at least one base station.

According to an embodiment of the present disclosure, regardless of whether the location determination message is transmitted, the second control module 450 may receive the location-related information from the at least one peripheral device 300. Accordingly, the peripheral device 300 may determine the header value of the BLE signal broadcast from the portable device 200 so as to generate the location-related information.

In the case where the portable device 200 is located in the vicinity of the first peripheral device 301, the location management unit 451 may receive the location-related information from the first peripheral device 301. The location management unit 451 may determine the time at which the first peripheral device 301 obtains the emergency signal, the intensity of the emergency signal and the location of the peripheral device 301, from the received location-related information. Since the emergency signal is obtained by the first peripheral device 301, the location management unit 451 may confirm that the portable device 200 exists within the communication range of the first peripheral device 301.

The location management unit 451 may estimate the distance between the portable device 200 and the first peripheral device 301 on the basis of the intensity of the emergency signal in the first peripheral device 301 and the location of the first peripheral device 301. The location management unit 451 may set locations corresponding to the estimated distance from the first peripheral device 301 as at least one candidate location for the first location.

According to an embodiment of the present disclosure, in the case where the portable device 200 is located in the vicinity of the second peripheral device 302, the third peripheral device 303, and the fourth peripheral device 304, the location management unit 451 may receive the location-related information from each of the peripheral devices 302 to 304. The location management unit 451 may determine the times at which the emergency signals are obtained, the intensities of the emergency signals, and the locations of the second to fourth peripheral devices 302 to 304, from the location-related information received from the second to fourth peripheral devices 302 to 304.

The location management unit 451 may confirm that the times at which the second to fourth peripheral devices 302 to 304 obtain the emergency signals are the same, similar to each other, or within a predetermined time range. According to a result of the confirmation, the location management unit 451 may confirm that the portable device 200 exists at a location where the communication ranges of the second to fourth peripheral devices 302 to 304 overlap each other. The location management unit 451 may estimate the distances between the portable device 200 and the peripheral devices 302 to 304 on the basis of the intensities of the emergency signals determined in the peripheral devices 302 to 304. The location management unit 451 may determine the first location of the portable device 200 using the estimated distances and the locations of the peripheral devices 302 to 304. The location management unit 451 may confirm that the times at which the second to fourth peripheral devices 302 to 304 obtain the emergency signals are not the same, similar to each other or within a predetermined time range. According to a result of the confirmation, the location management unit 451 may determine the location of the portable device 200 on the basis of the times at which the emergency signals are obtained and the intensities of the emergency signals. The location management unit 451 may call map data stored in the second memory 440, and may display the first location on the map data.

The location management unit 451 may receive the location-related information from the at least one peripheral device 300 before a predetermined time elapses after determining the first location of the portable device 200. The location management unit 451 may determine the second location of the portable device 200 using the received location-related information. The location management unit 451 may determine the second location in the same manner as the determining of the first location.

When the determining of the first and second locations of the portable device 200 is completed, the route management unit 452 may connect the plurality of determined locations so as to generate the moving route of the portable device 200.

According to an embodiment of the present disclosure, the location management unit 451 may determine the first location from the location-related information received from the at least one peripheral device 300, e.g., the first peripheral device 301. The location management unit 451 may determine the second location from the location-related information received from at least three peripheral devices 300, e.g., the second to fourth peripheral devices 302 to 304. The location management unit 451 may refine the first location using the second location. The location management unit 451 may confirm that the first location of the portable device 200 is within the communication range of the first peripheral device 301, but may not be able to confirm the direction to the first location. Therefore, the location management unit 451 may extract a plurality of candidate locations that are likely to be the first location. The location management unit 451 may re-extract, from the plurality of candidate locations, candidate locations to which the portable device 200 is able to be moved, and may refine the first location with the candidate location having a shortest straight distance to the second location among the re-extracted candidate locations.

According to an embodiment of the present disclosure, the location management unit 451 may determine the first location from the location-related information received from at least three peripheral devices 300, e.g., the second to fourth peripheral devices 302 to 304. The location management unit 451 may determine the second location from the location-related information received from the at least one peripheral device 300, e.g., the first peripheral device 301. The location management unit 451 may refine the second location using the first location. The refining of the second location may be performed in the same manner as the refining of the first location.

The route management unit 452 may connect the first location refined by the location management unit 451 to the second location, or may connect the first location to the refined second location, so as to generate the moving route of the portable device 200. The route management unit 452 may transmit the generated moving route to the electronic device 100 paired with the portable device 200.

According to an embodiment of the present disclosure, the server device 400 for determining the location of the portable device 200 may include the second communication module 410 for communicating with the at least one peripheral device 300 and the second control module 450 for determining the first location of the portable device 200 according to the location-related information generated by the at least one peripheral device 300 on the basis of broadcast signals broadcast from the at least one portable device 200. Upon receiving the location determination message for determining the location of the portable device 200 from the at least one electronic device 100, the second control module 450 may transmit the location determination message to the at least one peripheral device 300 located within a certain range.

The second control module 450 may determine the second location of the portable device 200 on the basis of the location-related information received from at least one peripheral device that is the same as or different from the peripheral device 300, and may connect the first and second locations so as to generate the moving route of the portable device 200. The second control module 450 may extract map data including any one of the first and second locations to provide the map data to the at least one electronic device 100 that has transmitted the location determination message.

The second control module 450 may determine the number of pieces of received location-related information when determining the first and second locations, may set one location determined from a greater number of pieces of location-related information as the first location, may set the other location as the second location, and then may refine the second location so that the second location has a shortest distance to the first location.

Figure 4:
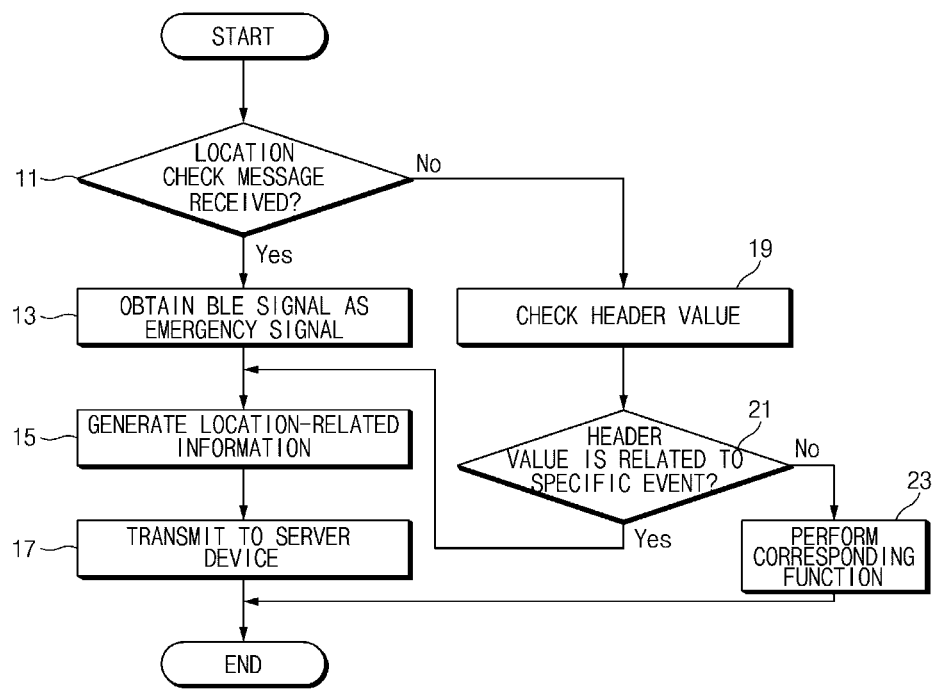
FIG. 4 is a flowchart illustrating a method for obtaining, by a peripheral device, a Bluetooth low energy (BLE) signal of a portable device according to an embodiment of the present disclosure.

FIG. 4 is a flowchart illustrating a method for obtaining, by a peripheral device, a BLE signal of a portable device according to an embodiment of the present disclosure.

Referring to FIGS. 1, 2, and 4, the peripheral device 300 may continuously receive the BLE signal broadcast from the at least one portable device 200. In operation 11, the peripheral device 300 may determine whether the location determination message is received from the server device 400. When the location determination message is received from the server device 400 in operation 11, the peripheral device 300 may obtain, as the emergency signal, the BLE signal broadcast from the portable device 200 corresponding to the unique number of the portable device 200 included in the location determination message, in operation 13.

In operation 15, the peripheral device 300 may generate the location-related information using the obtained emergency signal. Accordingly, the location-related information may include the identification number of the peripheral device 300, the location information of the peripheral device 300, the time at which the emergency signal is obtained and the intensity of the emergency signal. In operation 17, the peripheral device 300 may transmit the generated location-related information to the server device 400.

If the location determination message is not received from the server device 400 in operation 11, the peripheral device 300 may perform operation 19. In operation 19, the peripheral device 300 may determine the header value of the protocol for the BLE signal broadcast from the portable device 200. For convenience, it is described herein that the peripheral device 300 determines the header value of the protocol for the BLE signal in the case where the location determination message is not received from the server device 400. However, the present disclosure is not limited thereto. For example, regardless of whether the location determination message is received, the peripheral device 300 may continuously receive the BLE signal broadcast from the portable device 200 to determine the protocol header value of the BLE signal.

In operation 21, the peripheral device 300 may determine whether the determined header value is related to a specific event. If the header value is related to the specific event, the peripheral device 300 may perform operation 15. Otherwise, the peripheral device 300 may perform operation 23. Accordingly, the specific event, which occurs in the portable device 200, may occur by an input indicating an emergency situation. If the specific event occurs in the portable device 200, the portable device 200 may change the header value of the protocol for the BLE signal that is being broadcast, so as to broadcast the BLE signal. In operation 23, a corresponding operation that is being performed in the peripheral device 300 may be continuously performed.

According to an embodiment of the present disclosure, a method for determining, by the peripheral device 300, the location of the at least one portable device 200 may include an operation of obtaining a broadcast signal broadcast from the at least one portable device 200, an operation of determining time information and location information at a time of obtaining the broadcast signal, an operation of generating location-related information including the time information and the location information, and an operation of providing the location-related information to at least one server device so that the server device determines the location of the portable device.

The method may further include an operation of obtaining the broadcast signal when a location determination message for determining the location of the portable device 200 is received from the server device 400, before determining the intensity of the broadcast signal.

The method may further include an operation of obtaining the broadcast signal if a header value of the broadcast signal is based on a specific event, before determining the intensity of the broadcast signal.

Figure 5:
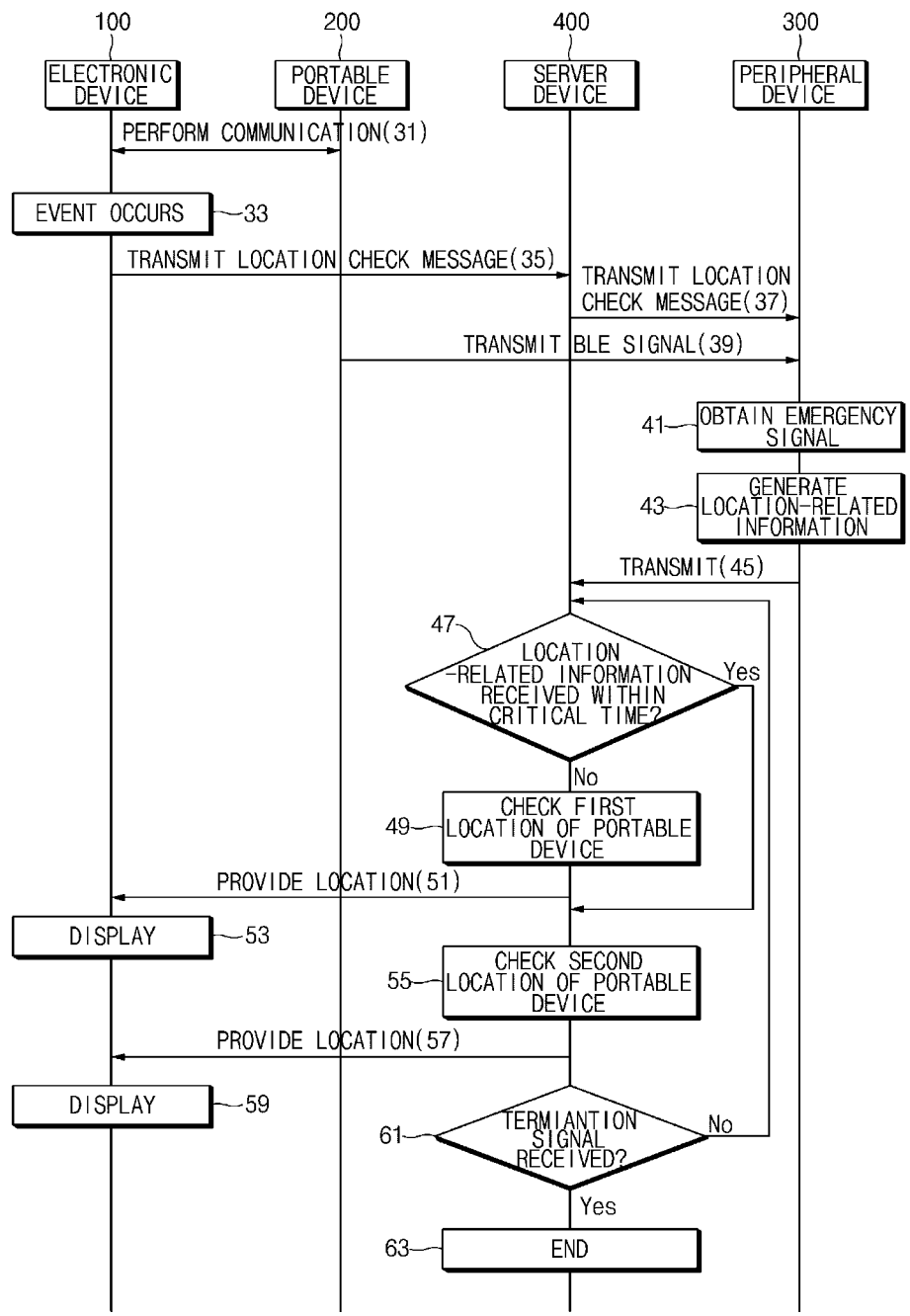
FIG. 5 is a flowchart illustrating a method for determining a location of a portable device and tracking a route of the portable device when an event occurs in an electronic device according to an embodiment of the present disclosure.

FIG. 5 is a flowchart illustrating a method for determining a location of a portable device and tracking a route of the portable device when an event occurs in an electronic device according to an embodiment of the present disclosure.

Referring to FIGS. 1, 3, and 5, in operation 31, the electronic device 100 and the portable device 200 may be paired with each other to perform Bluetooth communication. In operation 33, the electronic device 100 may confirm that an event for determining the location of the portable device 200 occurs. Thus, the event may occur due to the termination of the Bluetooth communication between the electronic device 100 and the portable device 200, or may occur due to an input of a user for determining the location of the portable device 200.

In operation 35, the electronic device 100 may transmit, to the server device 400, the location determination message for determining the location of the portable device 200 on the basis of the event that has occurred. The location determination message may include the unique information including the identification number of the portable device 200 paired with the electronic device 100, and may include the unique information such as the phone number and the identification number of the electronic device 100 and the location information of the electronic device 100. In operation 37, the server device 400 may transmit the received location determination message to the at least one peripheral device 300. Accordingly, the at least one peripheral device 300 may exist within a certain range from the electronic device 100, and the peripheral device 300 may exist within the communication range of at least one base station located within the certain range from the electronic device 100.

In operation 39, the portable device 200 may broadcast the BLE signal. Thus, although the portable device 200 may broadcast the BLE signal in real time, it is exemplarily described, for convenience, that the portable device 200 broadcasts the BLE signal to the peripheral device 300 in operation 39. The BLE signal may include the unique information including the identification number of the portable device 200. In operation 41, the peripheral device 300 may determine the unique information of the portable device 200 that broadcasts the BLE signal. If the unique information of the portable device 200 is the same as the unique information included in the location determination message, the electronic device 100 may obtain the BLE signal as the emergency signal. In operation 43, the peripheral device 300 may generate the location-related information on the basis of the obtained emergency signal. In operation 45, the peripheral device 300 may transmit the generated location-related information to the server device 400.

In operation 47, the server device 400 may determine whether the location-related information received from the at least one peripheral device 300 has been received within a certain time. If it is confirmed that the location-related information has been firstly received after a lapse of the certain time, the server device 400 may perform operation 49. In operation 49, the server device 400 may determine the first location of the portable device 200 using the received location-related information. According to an embodiment of the present disclosure, in the case where the portable device 200 is located in the vicinity of at least one peripheral device, e.g., the first peripheral device 301, the server device 400 may receive the location-related information from the first peripheral device 301. The server device 400 may determine the time at which the first peripheral device 301 obtains the emergency signal, the intensity of the emergency signal and the location of the peripheral device 301, from the received location-related information. Since the emergency signal is obtained by the first peripheral device 301, the server device 400 may confirm that the portable device 200 exists within the communication range of the first peripheral device 301. The server device 400 may estimate the distance between the portable device 200 and the first peripheral device 301 on the basis of the intensity of the emergency signal determined in the first peripheral device 301 and the location of the first peripheral device 301. The server device 400 may determine the first location of the portable device 200 using the estimated distance and the location of the first peripheral device 301.

According to an embodiment of the present disclosure, in the case where the portable device 200 is located in the vicinity of a plurality of peripheral devices, e.g., the second to fourth peripheral devices 302 to 304, the server device 400 may receive the location-related information from each of the peripheral devices 302 to 304. The server device 400 may determine the times at which the second to fourth peripheral devices 302 to 304 obtain the emergency signals, the intensities of the emergency signals and the locations of the second to fourth peripheral device 302 to 304, from the received location-related information, as described above. If the times at which the second to fourth peripheral devices 302 to 304 obtain the emergency signals are the same or similar to each other, the server device 400 may confirm that the portable device 200 exists at a location where the communication ranges of the second to fourth peripheral devices 302 to 304 overlap each other. The server device 400 may estimate the distances between the portable device 200 and the peripheral devices 302 to 304 on the basis of the intensities of the emergency signals determined in the peripheral devices 302 to 304. The server device 400 may determine the first location of the portable device 200 using the estimated distances and the locations of the peripheral devices 302 to 304.

The server device 400 that has determined the first location in operation 49 may perform operation 51. In operation 51, the server device 400 may transmit the determined first location of the portable device 200 to the electronic device 100. According to an embodiment of the present disclosure, the server device 400 may call map data including the first location, and may display the first location on the map data. The server device 400 may transmit, to the electronic device 100, the map data on which the first location is displayed. In operation 53, the electronic device 100 may output the received map data. In the case where the first location is determined by the first peripheral device 301, the server device 400 may confirm that the portable device 200 is located within the communication range of the first peripheral device 301 but may not easily confirm the direction to the portable device 200. Therefore, the server device 400 may display, on the map data, a plurality of candidate locations that are likely to be the first location.

If the location-related information received from the at least one peripheral device 300 has not been firstly received after a lapse of the certain time in operation 47, the server device 400 may perform operation 55. In operation 55, the server device 400 may determine the second location of the portable device 200 using the received location-related information. According to an embodiment of the present disclosure, in a situation where the first location has been determined from the location-related information received from the first peripheral device 301, the server device 400 may receive the location-related information from each of the second and third peripheral devices 302 and 303. The server device 400 may determine the second location of the portable device 200 using the location-related information received from each of the second and third peripheral devices 302 and 303.

If the times at which the second and third peripheral devices 302 and 303 obtain the emergency signals are the same or similar to each other, or within a certain range, the server device 400 may confirm that the portable device 200 exists at a location where the communication ranges of the second and third peripheral devices 302 and 303 overlap each other. The server device 400 may estimate the distances between the portable device 200 and the peripheral devices 302 and 303 on the basis of the intensities of the emergency signals determined in the second and third peripheral devices 302 and 303. The server device 400 may determine the second location of the portable device 200 using the estimated distances and the locations of the peripheral devices 302 and 303. The server device 400 may compensate, on the basis of the second location, the first location of the portable device 200 determined in operation 49. The server device 400 may confirm that the first location of the portable device 200 is within the communication range of the first peripheral device 301, but may not be able to determine the direction to the first location. Therefore, the server device 400 may extract, from a plurality of candidate locations extracted as candidates for the first location, candidate locations to which the portable device 200 is able to be moved. The server device 400 may refine the first location with a candidate location having a shortest straight distance to the second location among the extracted candidate locations.

According to an embodiment of the present disclosure, the server device 400 may determine the first location from the location-related information received from the second to fourth peripheral devices 302 to 304. In a situation where the first location has been determined, the server device 400 may receive the location-related information from at least one peripheral device, e.g., the first peripheral device 301. The server device 400 may determine the second location of the portable device 200 using the location-related information received from the first peripheral device 301.

The server device 400 may determine the time at which the first peripheral device 301 obtains the emergency signal, the intensity of the emergency signal and the location of the peripheral device 301, from the location-related information received from the first peripheral device 301. Since the emergency signal is obtained by the first peripheral device 301, the server device 400 may confirm that the portable device 200 exists within the communication range of the first peripheral device 301. The server device 400 may estimate the distance between the portable device 200 and the first peripheral device 301 on the basis of the intensity of the emergency signal determined in the first peripheral device 301 and the location of the first peripheral device 301. The server device 400 may determine the second location of the portable device 200 using the estimated distance and the location of the first peripheral device 301. The server device 400 may refine the determined second location on the basis of the first location of the portable device 200 determined in operation 49. The server device 400 may confirm that the second location of the portable device 200 is within the communication range of the first peripheral device 301, but may not be able to determine the direction to the second location. Therefore, the server device 400 may extract, from a plurality of candidate locations, candidate locations to which the portable device 200 is able to move, and may refine the second location with the candidate location having a shortest straight distance to the first location among the extracted candidate locations.

The server device 400 that has determined the second location in operation 55 may perform operations 57 and 59. Accordingly, since operations 57 and 59 are the same as operations 51 and 53 respectively, detailed descriptions of operations 57 and 59 are omitted. When a termination signal for the location-related information is received in operation 61, the server device 400 may perform operation 63 so as to terminate the above-mentioned operations for determining the location of the portable device 200. If the termination signal for the location-related information is not received in operation 61, the process may return to operation 47. The server device 400 may continuously determine the location of the portable device 200 from the location-related information received from the at least one peripheral device 300, so as to transmit the determined location to the electronic device 100. Accordingly, the termination signal may be generated when the emergency signal is not broadcast any more from the portable device 200 since the electronic device 100 and the portable device 200 re-communicate with each other. The termination signal may be received from the electronic device 100 when a user of the electronic device 100 makes a termination request.

Figure 6:
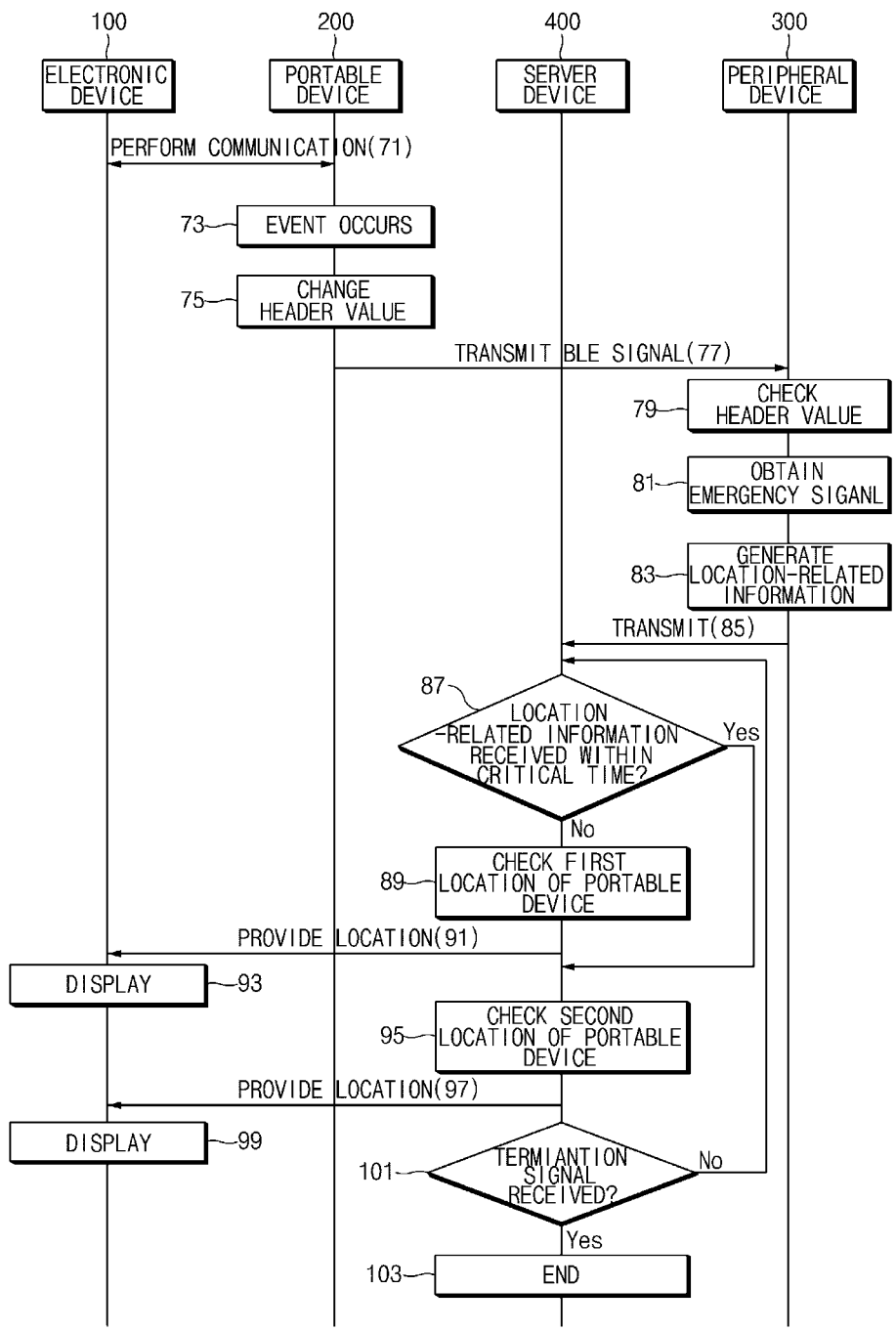
FIG. 6 is a flowchart illustrating a method for determining a location of a portable device, and tracking a route of the portable device when an event occurs in the portable device, according to an embodiment of the present disclosure.

FIG. 6 is a flowchart illustrating a method for determining a location of a portable device and tracking a route of the portable device when an event occurs in the portable device according to an embodiment of the present disclosure.

Referring to FIGS. 1, 3, 5, and 6, in operation 71, the electronic device 100 and the portable device 200 may be paired with each other to perform Bluetooth communication. If a specific event occurs in the portable device 200 in operation 73, the portable device 200 may change the header value of the protocol for the BLE signal in operation 75. Accordingly, the specific event may occur by an input through a button provided to the portable device 200. In operation 77, the portable device 200 may broadcast, to the at least one peripheral device 330, the BLE signal of which the header value has been changed.

In operation 79, the at least one peripheral device 300 may determine the header value of the protocol for the BLE signal broadcast from the portable device 200. If the determined header value of the protocol is the header value changed in operation 75, the peripheral device 300 may obtain the BLE signal as the emergency signal in operation 81. In operation 83, the peripheral device 300 may generate the location-related information on the basis of the obtained emergency signal. Since operations 85, 87, 89, 91, 93, 95, 97, 99, 101, and 103 are the same as operations 45, 47, 49, 51, 53, 55, 57, 59, 61, and 63 of FIG. 5 respectively, detailed descriptions of operations 85 to 103 are omitted.

According to an embodiment of the present disclosure, a method for determining, by the server device, the location of the at least one portable device 200, may include an operation of receiving the location-related information generated from the at least one peripheral device 300 on the basis of the broadcast signal broadcast from the at least one portable device 200 and an operation of determining the portable device 200 using the location-related information.

The method may further include an operation of receiving the location determination message for determining the location of the portable device 200 from the at least one electronic device 100 and an operation of transmitting the location determination message of the portable device 200 to the at least one peripheral device 300 located within a certain range from the electronic device 100, before the operation of receiving the location-related information.

The method may further include an operation of determining the second location of the portable device 200 using the location-related information received from at least one peripheral device that is the same as or different from the at least one peripheral device 300, after an operation of determining the first location.

The method may further include an operation of extracting map data including any one of the first and second locations to provide the map data to the at least one electronic device 100, after the operation of determining the second location.

The method may further include an operation of determining the number of pieces of received location-related information when determining the first and second locations, an operation of setting one location determined from a greater number of pieces of location-related information as the first location and setting the other location as the second location, and an operation of refining the second location so that the second location has a shortest distance to the first location, after the operation of determining the second location.

The method may further include an operation of connecting the first location to the second location to generate the moving route of the portable device 200 and an operation of displaying the generated moving route on map data, after the operation of refining the second location.

FIGS. 7A to 7D are diagrams illustrating a method for determining a location of a portable device and tracking a route of the portable device according to an embodiment of the present disclosure.

Figure 7A:
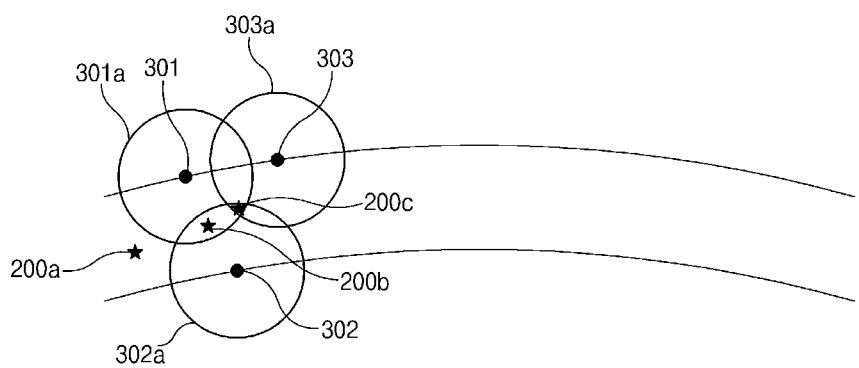
FIGS. 7A, 7B, 7C, and 7D are diagrams illustrating a method for determining a location of a portable device and tracking a route of the portable device according to an embodiment of the present disclosure.

Referring to FIGS. 1 and 7A to 7D, the portable device 200 paired with the server device 400 to wirelessly communicate therewith may broadcast the BLE signal in real time or periodically using a BLE communication technology. When a specific event occurs in the portable device 200 or the electronic device 100, the at least one peripheral device 300 may obtain the BLE signal broadcast from the portable device 200 as the emergency signal, as illustrated in FIG. 7A. 200a may indicate a location where the portable device 200 was when the specific event occurred.

The server device 400 may receive the location-related information from the first and second peripheral devices 301 and 302 illustrated in FIG. 7A. The server device 400 may determine the times at which the peripheral devices 301 and 302 obtain the emergency signals, from the location-related information received from the first and second peripheral devices 301 and 302. For example, if the times at which the first and second peripheral devices 301 and 302 obtain the emergency signals are the same or similar to each other, the server device 400 may confirm that the portable device 200 exists at a location where the communication ranges of the first and second peripheral devices 301 and 302 overlap each other, as illustrated in FIG. 7A.

The server device 400 may determine the intensities of the emergency signals obtained by the first and second peripheral devices 301 and 302, from the location-related information received from the first and second peripheral devices 301 and 302. The server device 400 may determine the distances between the portable device 200 and the first and second peripheral devices 301 and 302, from the determined intensities of the emergency signals. The server device 400 may confirm that the first location of the portable device 200 is 200b on the basis of the times at which the emergency signals are obtained, the intensities of the emergency signals and the locations of the first and second peripheral devices 301 and 302.

Before a lapse of a certain time, the server device 400 may receive the location-related information from each of the first to third peripheral devices 301 to 303. The server device 400 may determine the times at which the first to third peripheral devices 301 to 303 obtain the emergency signals, from the location-related information received from the first to third peripheral devices 301 to 303. The server device 400 may confirm that the portable device 200 exists at a location where communication ranges 301a to 303a of the first to third peripheral devices 301 to 303 overlap each other on the basis of the times at which the emergency signals are obtained, as illustrated in FIG. 7A. The server device 400 may determine the intensities of the emergency signals obtained by the first to third peripheral devices 301 to 303, from the location-related information received from the first to third peripheral devices 301 to 303. The server device 400 may determine the distances between the portable device 200 and the first to third peripheral devices 301 to 303, from the determined intensities of the emergency signals. For example, the server device 400 may confirm that the first location of the portable device 200 is 200c.

Figure 7B:
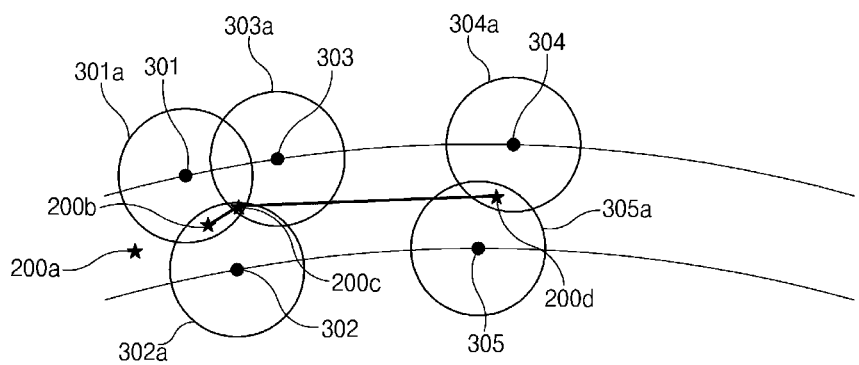

Before a lapse of a certain time, the server device 400 may confirm that the second location of the portable device 200 is 200d upon receiving the location-related information from the fourth peripheral device 304 and a fifth peripheral device (not illustrated) as illustrated in FIG. 7B. Reference signs 304a and 305a may represent the communications ranges of the fourth peripheral device 304 and the fifth peripheral device respectively. Accordingly, the location 200c that is the second location of the portable device 200 may be updated to the first location. The server device 400 may connect 200c and 200d so as to generate the moving route of the portable device 200 as illustrated in FIG. 7B.

Figure 7C:
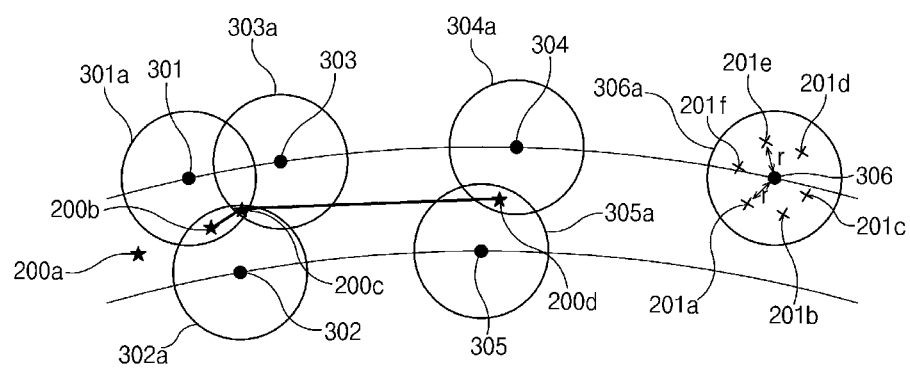

The server device 400 may confirm that the second location of the portable device 200 is 200d, and may receive the location-related information from a sixth peripheral device (not illustrated) illustrated in FIG. 7C before a lapse of a certain time. The server device 400 may confirm that the second location of the portable device 200 is within a communication range 306a of the sixth peripheral device. The server device 400 may update 200d as the second location of the portable device 200 to the first location. The server device 400 may estimate the distance between the portable device 200 and the sixth peripheral device using the location-related information, so as to determine the second location. Since the server device 400 is not able to determine a correct direction to the portable device 200, the server device 400 may extract a plurality of candidate locations 201a to 201f as illustrated in FIG. 7C. The plurality of candidate locations may be spaced apart from the portable device 200 by the same distance r.

Figure 7D:
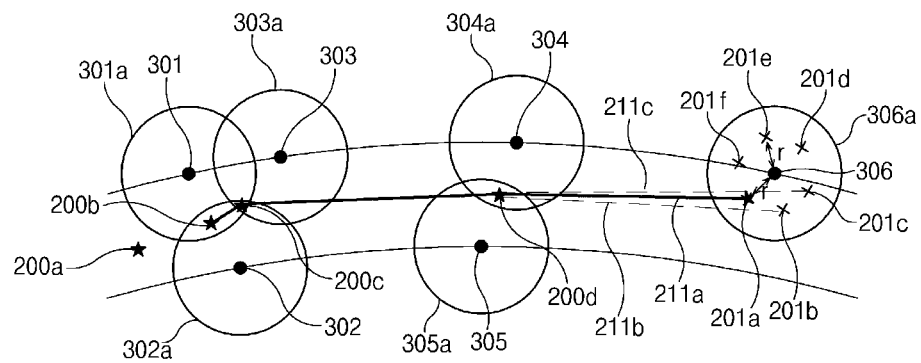

As illustrated in FIG. 7D, the server device 400 may extract, from the plurality of candidate locations 201 to 201f, candidate locations to which the portable device 200 is able to move, e.g., the candidate locations 201 to 201c. The server device 400 may straightly connect the extracted candidate locations 201a to 201c to the first location, i.e., 200d, as represented by reference signs 211a to 211c so as to extract a candidate location having a shortest distance to the first location, e.g., the candidate location 201a. The server device 400 may refine the plurality of candidate locations to determine the second location, i.e., 201a, of the portable device 200, and may connect the second location to the first location, i.e., 200d, to generate the moving route of the portable device 200.

FIGS. 8A and 8B are diagrams illustrating screens of a user interface of an electronic device for determining a location of a portable device according to an embodiment of the present disclosure.

Referring to FIGS. 1, 7A to 7D, and 8A and 8B, the electronic device 100 may be paired with the portable device 200 referred to as "eldest daughter" so as to perform Bluetooth communication. In a situation where a user of the electronic device 100 does not directly select termination of the connection to the portable device 200, if the communication connection to the portable device 200 is terminated or a signal for determining the location of the portable device 200 is input by the user, a message 501 may be output through the electronic device 100 as illustrated in FIG. 8A. Accordingly, the termination of the communication connection may occur when the electronic device 100 and the portable device 200 are so spaced apart from each other as to be unable to communicate with each other. If the user selects "YES" from the message 501, the electronic device 100 may determine the location and route of the portable device 200.

The electronic device 100 may receive the location of the portable device 200 from the server device 400 to display the location of the portable device 200 as illustrated in FIG. 8B. The method for determining the location of the portable device 200 has been described with reference to FIGS. 7A to 7D, and is thus not described in detail here. The electronic device 100 may display a location 510 of the electronic device 100 on map data and may display a determined location 520 of the portable device 200 on the map data, as illustrated in FIG. 8B.

When "eldest daughter" corresponding to the location 502 is selected, the electronic device 100 may determine additional information such as a moving speed of the portable device 200. If the electronic device 100 is moved to such a location as to be able to communicate with the portable device 200 or a signal for terminating the determining of the location of the portable device 200 is input by the user, the electronic device 100 may terminate the determining of the location and route of the portable device 200. Furthermore, the portable device 200 may terminate the broadcasting of the emergency signal.

Figure 9:
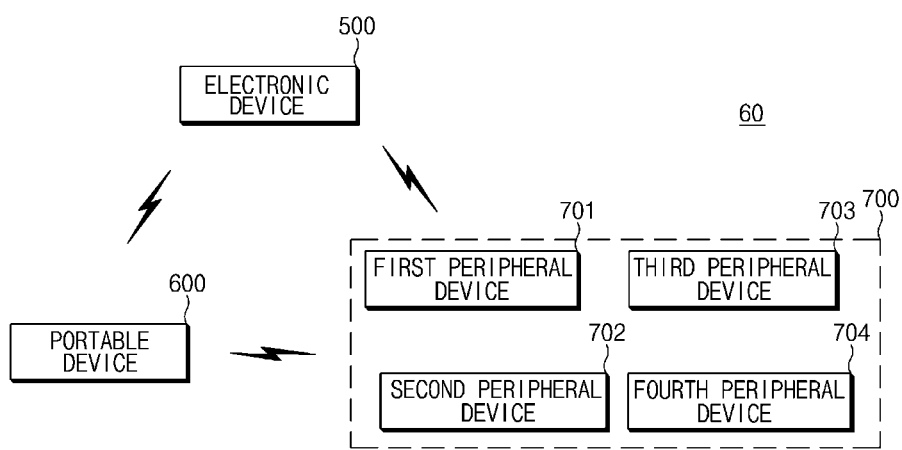
FIG. 9 is a block diagram illustrating a system for determining a location of a portable device according to an embodiment of the present disclosure.

FIG. 9 is a block diagram illustrating a system for determining a location of a portable device according to another embodiment of the present disclosure.

Referring to FIGS. 1 and 9, a location determining system 60 according to the present disclosure may include an electronic device 500, a portable device 600 and at least one peripheral device 700. Accordingly, the electronic device 500 which is a master device may be paired with the portable device 600. The portable device 600 which is a slave device of the electronic device 500 may be connected thereto. The portable device 600 may be connected to the electronic device 500 using a short-range wireless communication technology such as Bluetooth so as to provide location-related information to the electronic device 500 according to control by the electronic device 500. The electronic device 500 may transmit, to the portable device 600, unique information including an identification number and a phone number of the electronic device 500.

The electronic device 500 may be connected to the portable device 600 using a short-range wireless communication technology such as Bluetooth so as to determine the location of the portable device 600 in real time or periodically. When the electronic device 500 is outside the coverage of the Bluetooth communication with the portable device 600, the Bluetooth connection to the portable device 600 may be terminated. When an emergency situation where location of the portable device 600 is unable to be determined in confirmed, the electronic device 500 may output an alarm indicating that communication with the portable device 600 is not available.

When the termination of the communication connection to the electronic device 500 is confirmed, the portable device 600 may change a header value of a protocol for a BLE signal, and may add the unique information of the electronic device 500 to the BLE signal to broadcast the BLE signal.

At least one peripheral device 700 may perform BLE communication to receive the BLE signal broadcast from the portable device 600. The at least one peripheral device 700 may obtain, as an emergency signal, the BLE signal of which the header value has been changed. The at least one peripheral device 700 may generate location-related information. The at least one peripheral device 700 may determine the unique information of the electronic device 500 included in the obtained emergency signal, and may transmit the generated location-related information to the electronic device 500 corresponding to the unique information.

The location-related information may include an identification number of the peripheral device 700, location information of the peripheral device 700, a time at which the emergency signal is obtained and an intensity of the emergency signal. The peripheral device 700 may be operated as described above with reference to FIG. 1.

The electronic device 500 may determine the location of the portable device 600 on the basis of the location-related information received from the at least one peripheral device 700, and may track a moving route of the portable device 600 using the determined location. The determining of the location and moving route of the portable device 600 may be performed in the same manner as the server device 400 of FIG. 1 determines the location and moving route of the portable device. Therefore, detailed descriptions of the determining of the location and moving route of the portable device 600 are omitted.

FIG. 10 is a block diagram illustrating an electronic device according to various embodiments of the present disclosure.

Referring to FIG. 10, an electronic device 1000 according to the present disclosure may constitute, e.g., a part or the entirety of the electronic device 100 or the peripheral device 200 illustrated in FIG. 1. Herein, it is assumed that the electronic device 1000 constitutes a part or the entirety of the peripheral device 200. The electronic device 1000 may include at least one application processor (AP) 1010, a communication module 1020, a subscriber identification module (SIM) card 1024, a memory 1030, a sensor module 1040, an input device 1050, a display 1060, an interface 1070, an audio module 1080, a camera module 1091, a power management module 1095, a battery 1096, an indicator 1097, and a motor 1098.

The AP 1010, e.g., the first control module 350 illustrated in FIG. 2, may run an operating system or an application program so as to control a plurality of hardware or software elements connected to the AP 1010, and may process various data including multimedia data and may perform an operation. The AP 1010 may be implemented with, for example, a system on chip (SoC). According to an embodiment of the present disclosure, the AP 1010 may further include a graphic processing unit (GPU, not illustrated). The AP 1010 may obtain, as an emergency signal, a BLE signal broadcast from at least one portable device. The AP 1010 may generate location-related information on the basis of the emergency signal, and may transmit the location-related information to a server device.

The communication module 1020, e.g., the first communication module 310 illustrated in FIG. 2, may perform data transmission/reception for communication between the electronic device 1000 (e.g., the peripheral device 200) and other electronic devices connected thereto through a network. According to an embodiment of the present disclosure, the communication module 1020 may include a cellular module 1021, a WiFi module 1023, a BT module 1025, a GPS module 1027, an NFC module 1028, and a radio frequency (RF) module 1029. The communication module 1020 may include a BLE communication module (not illustrated) for performing BLE communication with at least one portable device. The BLE communication module may obtain the BLE signal broadcast from the at least one portable device as the emergency signal. The communication module 1020 may include a server communication module (not illustrated) for communication with the server device. The server communication module may provide a location determination message received from the server device to the AP 1010. The server communication module may transmit the location-related information to the server device according to control by the AP 1010.

The cellular module 1021 may provide a voice call service, a video call service, a text message service, or an Internet service through a communications network (e.g., LTE, LTE-A, CDMA, WCDMA, UMTS, WiBro or GSM network). Furthermore, the cellular module 1021 may identify and authenticate electronic devices in the communications network using, for example, a subscriber identification module (e.g., the SIM card 1024). According to an embodiment of the present disclosure, the cellular module 1021 may perform at least a part of functions provided by the AP 1010. For example, the cellular module 1021 may perform at least a part of a multimedia control function.

According to an embodiment of the present disclosure, the cellular module 1021 may include a communication processor (CP). The cellular module 1021 may be implemented with, for example, a SoC. Although FIG. 10 illustrates that the cellular module 1021 (e.g., a communication processor), the memory 1030 and the power management module 1095 are separated from the AP 1010, the AP 1010 may include at least a part of the foregoing elements (e.g., the cellular module 1021), according to an embodiment of the present disclosure.

According to an embodiment of the present disclosure, the AP 1010 or the cellular module 1021 (e.g., a communication processor) may load, on a volatile memory, a command or data received from at least one of a nonvolatile memory and another element connected to the AP 1010 or the cellular module 1021, so as to process the command or data. Furthermore, the AP 1010 or cellular module 1021 may store, in the nonvolatile memory, data received from or generated by at least one of the other elements.

Each of the WiFi module 1023, the BT module 1025, the GPS module 1027 and the NFC module 1028 may include, for example, a processor for processing data transmitted/received through the modules. FIG. 10 illustrates the cellular module 1021, the WiFi module 1023, the BT module 1025, the GPS module 1027 and the NFC module 1028 as if the modules are separate blocks. However, according to an embodiment of the present disclosure, at least a part (e.g., two or more) of the cellular module 1021, the WiFi module 1023, the BT module 1025, the GPS module 1027 and the NFC module 1028 may be included in a single integrated chip (IC) or IC package. For example, at least a part (e.g., a communication processor corresponding to the cellular module 1021 and a WiFi processor corresponding to the WiFi module 1023) of processors corresponding to the cellular module 1021, the WiFi module 1023, the BT module 1025, the GPS module 1027 and the NFC module 1028 may be implemented with a single SoC.

The RF module 1029 may transmit/receive data, for example, may transmit/receive an RF signal. Although not illustrated, for example, a transceiver, a power amp module (PAM), a frequency filter or a low noise amplifier (LNA) may be included in the RF module 1029. Furthermore, the RF module 1029 may further include a component such as a conductor or a wire for transmitting/receiving free-space electromagnetic waves in a wireless communication system. FIG. 10 illustrates the cellular module 1021, the WiFi module 1023, the BT module 1025, the GPS module 1027 and the NFC module 1028 as if the modules share the single RF module 1029. However, according to an embodiment of the present disclosure, at least one of the cellular module 1021, the WiFi module 1023, the BT module 1025, the GPS module 1027 and the NFC module 1028 may transmit/receive RF signals through an additional RF module.

The SIM card 1024 may include a subscriber identification module, and may be inserted into a slot formed at a specific location of the electronic device. The SIM card 1024 may include unique identification information (e.g., an integrated circuit card identifier (ICCID)) or subscriber information (e.g., international mobile subscriber identity (IMSI)).

The memory 1030, e.g., the first memory 340 of FIG. 2, may include an internal memory 1032 or an external memory 1034. The internal memory 1032 may include at least one of a volatile memory (e.g., a dynamic Random Access Memory (DRAM), a static RAM (SRAM) or a synchronous dynamic RAM (SDRAM)) and a nonvolatile memory (e.g., a one time programmable Read-Only Memory (OTPROM), a programmable ROM (PROM), an erasable and programmable ROM (EPROM), an electrically erasable and programmable ROM (EEPROM), a mask ROM, a flash ROM, a Not And (NAND) flash memory, or a Not Or (NOR) flash memory).

According to an embodiment of the present disclosure, the internal memory 1032 may be a solid state drive (SSD). The external memory 1034 may include a flash drive, for example, compact flash (CF), secure digital (SD), micro secure digital (Micro-SD), mini secure digital (Mini-SD), extreme digital (xD) or a memory stick. The external memory 1034 may be functionally connected to the electronic device 1000 through various interfaces. According to an embodiment of the present disclosure, the electronic device 1000 may further include a storage device (or a storage medium) such as a hard drive.

The sensor module 1040 may measure physical quantity or detect an operation state of the electronic device 1000 so as to convert measured or detected information into an electric signal. The sensor module 1040 may include, for example, at least one of a gesture sensor 1040A, a gyro sensor 1040B, an atmospheric pressure sensor 1040C, a magnetic sensor 1040D, an acceleration sensor 1040E, a grip sensor 1040F, a proximity sensor 1040G, a color sensor 1040H (e.g., RGB sensor), a biometric sensor 1040I, a temperature/humidity sensor 1040J, an illuminance sensor 1040K, and an ultraviolet (UV) sensor 1040M. Additionally or alternatively, the sensor module 1040 may include, for example, an olfactory sensor (E-nose sensor, not illustrated), an electromyography (EMG) sensor (not illustrated), an electroencephalogram (EEG) sensor (not illustrated), an electrocardiogram (ECG) sensor (not illustrated), an infrared (IR) sensor (not illustrated), an iris recognition sensor (not illustrated), or a fingerprint sensor (not illustrated). The sensor module 1040 may further include a control circuit for controlling at least one sensor included therein.

The input device 1050, e.g., the first input module 320 of FIG. 2, may include a touch panel 1052, a (digital) pen sensor 1054, a key 1056, or an ultrasonic input device 1058. The touch panel 1052 (e.g., the output module 140) may recognize a touch input using at least one of capacitive, resistive, infrared and ultraviolet sensing methods. The touch panel 1052 may further include a control circuit. In the case of using the capacitive sensing method, a physical contact recognition or proximity recognition is allowed. The touch panel 1052 may further include a tactile layer. In this case, the touch panel 1052 may provide tactile reaction to a user.

The (digital) pen sensor 1054 may be implemented in a similar or same manner as that for receiving a touch input of a user, or may be implemented using an additional sheet for recognition. The key 1056 (e.g., the input module 130) may include, for example, a physical button, an optical button, or a keypad. The ultrasonic input device 1058 may enable the electronic device 1000 to sense, through a microphone, sound waves from an input tool that generates ultrasonic signals so as to identify data, wherein the ultrasonic input device 1058 is capable of wireless recognition. According to an embodiment of the present disclosure, the electronic device 1000 may use the communication module 1020 so as to receive a user input from an external device (e.g., a computer or server) connected to the communication module 1020.

The display 1060, e.g., the first output module 330 of FIG. 2, may include a panel 1062, a hologram device 1064, or a projector 1066. The panel 1062 may be, for example, a LCD or an active-matrix organic light-emitting diode (AM-OLED). The panel 1062 may be, for example, flexible, transparent or wearable. The panel 1062 and the touch panel 1052 may be integrated into a single module. The hologram device 1064 may display a stereoscopic image in a space using a light interference phenomenon. The projector 1066 may project light onto a screen so as to display an image. The screen may be arranged in the inside or the outside of the electronic device 1000. According to an embodiment of the present disclosure, the display 1060 may further include a control circuit for controlling the panel 1062, the hologram device 1064, or the projector 1066.

The interface 1070 may include, for example, a high definition multimedia interface (HDMI) 1072, a USB 1074, an optical interface 1076, or a D-subminiature (D-sub) 1078. Additionally or alternatively, the interface 1070 may include, for example, a mobile high-definition link (MHL) interface, a secure digital (SD) card/multi-media card (MMC) interface, or an infrared data association (IrDA) interface.

The audio module 1080 may convert a sound into an electric signal or vice versa. The audio module 1080 may process sound information input or output through a speaker 1082, a receiver 1084, an earphone 1086, or a microphone 1088.

The camera module 1091 for shooting a still image or a video may include at least one image sensor (e.g., a front sensor or a rear sensor), a lens (not illustrated), an image signal processor (ISP, not illustrated), or a flash (e.g., an LED or a xenon lamp, not illustrated).

The power management module 1095 may manage power of the electronic device 1000. Although not illustrated, a power management integrated circuit (PMIC), a charger integrated circuit (IC), or a battery or fuel gauge may be included in the power management module 1095.

The PMIC may be mounted on an integrated circuit or a SoC semiconductor. A charging method may be classified into a wired charging method and a wireless charging method. The charger IC may charge a battery, and may prevent an overvoltage or an overcurrent from being introduced from a charger. According to an embodiment of the present disclosure, the charger IC may include a charger IC for at least one of the wired charging method and the wireless charging method. The wireless charging method may include, for example, a magnetic resonance method, a magnetic induction method or an electromagnetic method, and may include an additional circuit, for example, a coil loop, a resonant circuit, or a rectifier.

The battery gauge may measure, for example, a remaining capacity of the battery 1096 and a voltage, current or temperature thereof while the battery is charged. The battery 1096 may store or generate electricity, and may supply power to the electronic device 1000 using the stored or generated electricity. The battery 1096 may include, for example, a rechargeable battery or a solar battery.

The indicator 1097 may indicate a specific state of the electronic device 1000 or a part thereof (e.g., the AP 1010), such as a booting state, a message state, or a charging state. The motor 1098 may convert an electrical signal into a mechanical vibration. Although not illustrated, a processing device (e.g., a GPU) for supporting a mobile TV may be included in the electronic device 1000. The processing device for supporting a mobile TV may process media data according to the standards of digital multimedia broadcasting (DMB), digital video broadcasting (DVB) or media flow.

Each of the above-mentioned elements of an electronic device, according to the present disclosure, may be configured with one or more components, and the names of the elements may be changed according to the type of the electronic device. The electronic device according to the present disclosure may include at least one of the above-mentioned elements, and some elements may be omitted or other additional elements may be added. Furthermore, some of the elements of the electronic device according to the present disclosure may be combined with each other so as to form one entity, so that the functions of the elements may be performed in the same manner as before the combination.

The term "module" used herein may represent, for example, a unit including one or more combinations of hardware, software and firmware. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" according to the present disclosure may include at least one of an application-specific integrated circuit (ASIC) chip, a field-programmable gate array (FPGA), and a programmable-logic device for performing some operations, which are known or will be developed.

According to various embodiments of the present disclosure, at least a part of devices (e.g., modules or functions thereof) or methods (e.g., operations) according to the present disclosure may be implemented as instructions stored in a computer-readable storage medium in the form of a programming module. In the case where the instructions are performed by at least one processor, the at least one processor may perform functions corresponding to the instructions. The computer-readable storage medium may be, for example, a memory. At least a part of the programming module may be implemented (e.g., executed) by a processor. At least a part of the programming module may include, for example, a module, a program, a routine, sets of instructions, or a process for performing at least one function.

The computer-readable storage medium may include a magnetic medium such as a hard disk, a floppy disk and a magnetic tape, an optical medium such as a compact disk read only memory (CD-ROM) and a DVD, a magneto-optical medium such as a floptical disk, and a hardware device configured to store and execute program instructions (e.g., programming module), such as a read only memory (ROM), a random access memory (RAM) and a flash memory. The program instructions may include machine language codes made by compilers and high-level language codes that can be executed by computers using interpreters. The above-mentioned hardware may be configured to be operated as one or more software modules for performing operations of the present disclosure and vice versa.

The module or programming module according to various embodiments of the present disclosure may include at least one of the above-mentioned elements, or some elements may be omitted or other additional elements may be added. Operations performed by the module, the programming module or the other elements may be performed in a sequential, parallel, iterative or heuristic way. Furthermore, some operations may be performed in another order or may be omitted, or other operations may be added.

As described above, according to the peripheral device, server device and method for determining a location of a portable device according to the various embodiments of the present disclosure, the location-related information is received from at least one peripheral device that has obtained the BLE signal broadcast from the portable device according to specific conditions. Therefore, the location and moving route of the portable device of which communication connection to an electronic device has been terminated can be continuously determined.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A peripheral device comprising:
   a communication module configured to communicate with at least one portable device and at least one server device; and
   a controller configured to:
      obtain a broadcast signal broadcast from the at least one portable device, and
      provide location-related information to the at least one server device configured to determine a location of the at least one portable device, the location-related information comprising a time at which the broadcast signal is obtained and location information of the peripheral device,
   wherein the controller selectively receives the broadcast signal as a specific event signal if a protocol header value of the broadcast signal changes after a specific event occurs.

2. The peripheral device of claim 1, wherein the controller is further configured to obtain the broadcast signal upon receiving, from the at least one server device, a location determination message for determining the location of the at least one portable device.

3. The peripheral device of claim 1, wherein the controller is further configured to obtain the broadcast signal in a case where a header value of the broadcast signal is based on the specific event.

4. The peripheral device of claim 1, wherein the location-related information comprises unique information of the at least one portable device, an identification information of the peripheral device, the location information of the peripheral device, the time at which the broadcast signal is obtained, and an intensity of the broadcast signal.

5. A method for determining a location of a portable device, the method comprising:
   obtaining a broadcast signal broadcast from at least one portable device;
   determining time information and location information at a time of the obtaining of the broadcast signal;
   generating location-related information comprising the time information and the location information; and
   providing the location-related information to at least one server device configured to determine the location of the at least one portable device,
   wherein the broadcast signal is received as a specific event signal if a protocol header value of the broadcast signal changes after a specific event occurs.

6. The method of claim 5, further comprising obtaining the broadcast signal when a location determination message for determining the location of the at least one portable device is received from the at least one server device, before determining an intensity of the broadcast signal.

7. The method of claim 5, further comprising obtaining the broadcast signal when a header value of the broadcast signal is based on the specific event, before determining an intensity of the broadcast signal.

8. A server device comprising:
   a communication module configured to communicate with at least one peripheral device; and
   a controller configured to:
      obtain a broadcast signal broadcast from at least one portable device, and
      determine a first location of the at least one portable device according to location-related information generated by the at least one peripheral device on a basis of a broadcast signal broadcast from the at least one portable device,
   wherein the broadcast signal is received as a specific event signal if a protocol header value of the broadcast signal changes after a specific event occurs.

9. The server device of claim 8, wherein the controller is further configured to transmit, upon receiving a location determination message for the determining of the first location of the at least one portable device from at least one electronic device, the location determination message to the at least one peripheral device.

10. The server device of claim 9, wherein the controller is further configured to determine a second location of the at least one portable device on a basis of location-related information received from the at least one peripheral device or at least one other peripheral device, and to connect the first and second locations to generate a moving route of the at least one portable device.

11. The server device of claim 10, wherein the controller is further configured to extract map data including at least one of the first location and the second location to provide the map data to the at least one electronic device that has transmitted the location determination message.

12. The server device of claim 11, wherein a second controller is configured to:
   determine the number of pieces of the received location-related information when determining the first location and the second location,
   set one location determined from a plurality of pieces of the location-related information as the first location,
   set another location as the second location, and
   compensate the second location so that the second location has a shortest distance to the first location.

13. The server device of claim 10, wherein the controller is further configured to transmit the moving route of the at least one portable device to the at least one electronic device.

14. A method for determining a location of a portable device, the method comprising:
   receiving location-related information generated from at least one peripheral device on a basis of a broadcast signal broadcast from at least one portable device; and
   determining a first location of the at least one portable device using the location-related information,
   wherein the broadcast signal is received as a specific event signal if a protocol header value of the broadcast signal changes after a specific event occurs.

15. The method of claim 14, further comprising:
   receiving a location determination message for determining the first location of the at least one portable device from at least one electronic device; and
   transmitting the location determination message of the at least one portable device to the at least one peripheral device located within a certain range from the at least one electronic device, before the receiving of the location-related information.

16. The method of claim 15, further comprising determining a second location of the at least one portable device using the location-related information received from the at least one peripheral device or at least one other peripheral device, after the determining the first location of the at least one portable device.

17. The method of claim 16, further comprising extracting map data comprising at least one of the first location and the second location to provide the map data to the at least one electronic device, after the determining of the second location.

18. The method of claim 16, further comprising:
   determining a number of pieces of the received location-related information when determining the first location and the second location;
   setting one location determined from a plurality of pieces of the location-related information as the first location and setting another location as the second location; and
   refining the second location so that the second location has a shortest distance to the first location, after the determining of the second location.

19. The method of claim 18, further comprising:
   connecting the first location and the second location to generate a moving route of the at least one portable device; and
   displaying the generated moving route on map data, after the refining of the second location.

20. The method of claim 19, further comprising transmitting the moving route of the at least one portable device to the at least one electronic device.

* * * * *